US012706021B2

(12) United States Patent
Hong et al.

(10) Patent No.: US 12,706,021 B2
(45) Date of Patent: Aug. 11, 2026

(54) CONTROLLER, DISPLAY DEVICE AND DRIVING METHOD

(71) Applicant: LG Display Co., Ltd., Seoul (KR)

(72) Inventors: Seokhyun Hong, Paju-si (KR); Tae-Wook Kim, Paju-si (KR); Jaeyoon Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/508,951

(22) Filed: Nov. 14, 2023

(65) Prior Publication Data

US 2024/0194129 A1 Jun. 13, 2024

(30) Foreign Application Priority Data

Dec. 8, 2022 (KR) ........................ 10-2022-0170217

(51) Int. Cl.
*G09G 3/32* (2016.01)

(52) U.S. Cl.
CPC ......... *G09G 3/32* (2013.01); *G09G 2310/027* (2013.01); *G09G 2310/061* (2013.01); *G09G 2310/08* (2013.01)

(58) Field of Classification Search
CPC .. G09G 3/30; G09G 3/3233; G09G 2320/043; G09G 2310/0262; G09G 3/32; G09G 2310/027; G09G 2310/061; G09G 2310/08; G09G 3/3275; G09G 2310/0286
See application file for complete search history.

(56) References Cited

U.S. PATENT DOCUMENTS

| | | | | |
|---|---|---|---|---|
| 11,361,713 B1 * | 6/2022 | Fu | ........................ | G09G 3/3241 |
| 2021/0264847 A1 * | 8/2021 | Jeong | ................... | G09G 3/3233 |
| 2022/0366835 A1 * | 11/2022 | Park | ...................... | G09G 3/3233 |
| 2022/0375413 A1 * | 11/2022 | Pyun | .................... | G09G 3/3275 |

FOREIGN PATENT DOCUMENTS

| | | |
|---|---|---|
| KR | 20220155537 A | 11/2022 |
| KR | 20220158150 A | 11/2022 |

* cited by examiner

*Primary Examiner* — Michael A Faragalla
(74) *Attorney, Agent, or Firm* — Seed Intellectual Property Law Group LLP

(57) ABSTRACT

According to embodiments of the present disclosure, there may be provided a controller, a display device and a driving method. In consideration of that a hysteresis by an image data voltage supplied to a subpixel during an active time may exert an influence on a real-time sensing process, by correcting a reference sensing driving data voltage on the basis of an offset voltage, it is possible to correct the influence of a hysteresis exerted on sensing of the characteristic value of a driving transistor.

11 Claims, 16 Drawing Sheets

| PXL | 1 | 2 | 3 | ... | n-1 | n |
|---|---|---|---|---|---|---|
| Vdata | 5.75V | 10V | 6V | ... | 8.5V | 9.3V |
| Vofs | 13mV | 25mV | 16mV | ... | 20mV | 21mV |

| PXL | 1 | 2 | 3 | ... | n-1 | n |
|---|---|---|---|---|---|---|
| Vdata_SEN | 5.75V | 10V | 6V | ... | 8.5V | 9.3V |
| Vofs | 13mV | 25mV | 16mV | ... | 20mV | 21mV |
| Vdata_SEN' | 7.513mV | 7.625mV | 7.416mV | ... | 7.52mV | 7.721mV |

CONTROLLER, DISPLAY DEVICE AND DRIVING METHOD

CROSS-REFERENCE TO RELATED APPLICATION

This application claims priority from Korean Patent Application No. 10-2022-0170217, filed on Dec. 8, 2022, which is hereby incorporated by reference for all purposes as if fully set forth herein.

BACKGROUND

Technical Field

Embodiments of the present disclosure relate to a controller, a display device and a driving method.

Description of Related Art

Among display devices being currently developed, there is a self-luminous display device in which subpixels disposed in a display panel include light emitting elements. Each subpixel disposed in the display panel of such a self-luminous display device may include a light emitting element which emits light by itself and a driving transistor for driving the light emitting element.

Driving transistors disposed in the display panel of the self-luminous display device may have a unique characteristic value. The driving transistor in each subpixel may degrade with the lapse of a driving time, and thus, the characteristic value thereof may change. In consideration of this fact, various compensation technologies for sensing and compensating characteristic values of the driving transistors have been developed.

Sensing of the characteristic value of the driving transistor may be performed as a real-time sensing process performed during a display driving. One frame time may include an active time and a blank time. Image driving may be performed during the active time, and the real-time sensing process may be performed during the blank time.

BRIEF SUMMARY

Inventors recognized that a data voltage supplied to the subpixel during the active time may produce a hysteresis. The hysteresis by the data voltage supplied to the subpixel during the active time may exert an influence on the real-time sensing process performed during the blank time and the hysteresis may exert an influence on the sensing of the characteristic value of the driving transistor.

Embodiments of the present disclosure are directed to a controller, a display device and a driving method thereof, capable of, in consideration of that a hysteresis by a data voltage supplied to a subpixel during an active time may exert an influence on a real-time sensing process, correcting the influence of a hysteresis exerted on sensing of the characteristic value of a driving transistor, by correcting a sensing driving data voltage on the basis of an offset voltage.

Embodiments of the present disclosure are directed to a controller, a display device and a driving method thereof capable of low power consumption by correcting the influence of a hysteresis.

Embodiments of the present disclosure may provide a display device including: a plurality of data lines; a plurality of reference voltage lines; and a plurality of subpixels connected to the plurality of data lines and the plurality of reference voltage lines, wherein the plurality of data lines include a first data line which is connected to a first subpixel among the plurality of subpixels, and the plurality of reference voltage lines include a first reference voltage line which is connected to the first subpixel, wherein the first subpixel includes a first light emitting element, a first driving transistor, a first scan transistor and a first sensing transistor, a first node of the first driving transistor is electrically connectable to the first data line through the first scan transistor, and a second node of the first driving transistor is electrically connectable to the first reference voltage line through the first sensing transistor, wherein an image data voltage is supplied to the first subpixel during an active time, and wherein a sensing driving data voltage is supplied to the first subpixel during a blank time after the active time, and the sensing driving data voltage is variable depending on the image data voltage.

Embodiments of the present disclosure may provide a method for driving a display device, including: first step of setting a sensing driving data voltage; second step of, by supplying the sensing driving data voltage to a first node of a driving transistor and supplying a sensing driving reference voltage to a second node of the driving transistor, initializing the first node and the second node of the driving transistor; third step of, by floating the second node of the driving transistor, changing a voltage of the second node of the driving transistor; and fourth step of, after a predetermined time elapses from a time point at which a voltage of the second node of the driving transistor is changed, sampling a voltage of the second node of the driving transistor, wherein the first step is performed after an image data voltage is supplied to a first subpixel/during an active time, and wherein, in the second step, the sensing driving data voltage is variable depending on the image data voltage.

Embodiments of the present disclosure may provide a controller including: a control signal output unit configured to output a data control signal to a data driving circuit; and a data output unit configured to output data to the data driving circuit, wherein the data output unit outputs, during an active time, image data to be supplied to a first subpixel among a plurality of subpixels disposed in a display panel, and wherein the data output unit outputs, during a blank time after the active time, sensing driving data to be supplied to the first subpixel, and the sensing driving data is variable depending on the image data.

According to the embodiments of the present disclosure, it is possible to provide a controller, a display device and a driving method thereof, capable of, in consideration of that a hysteresis by a data voltage supplied to a subpixel during an active time may exert an influence on a real-time sensing process, correcting the influence of a hysteresis exerted on sensing of the characteristic value of a driving transistor, by correcting a sensing driving data voltage on the basis of an offset voltage.

According to the embodiments of the present disclosure, it is possible to provide a controller, a display device and a driving method thereof capable of low power consumption by correcting the influence of a hysteresis.

DESCRIPTION OF THE SEVERAL VIEWS OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
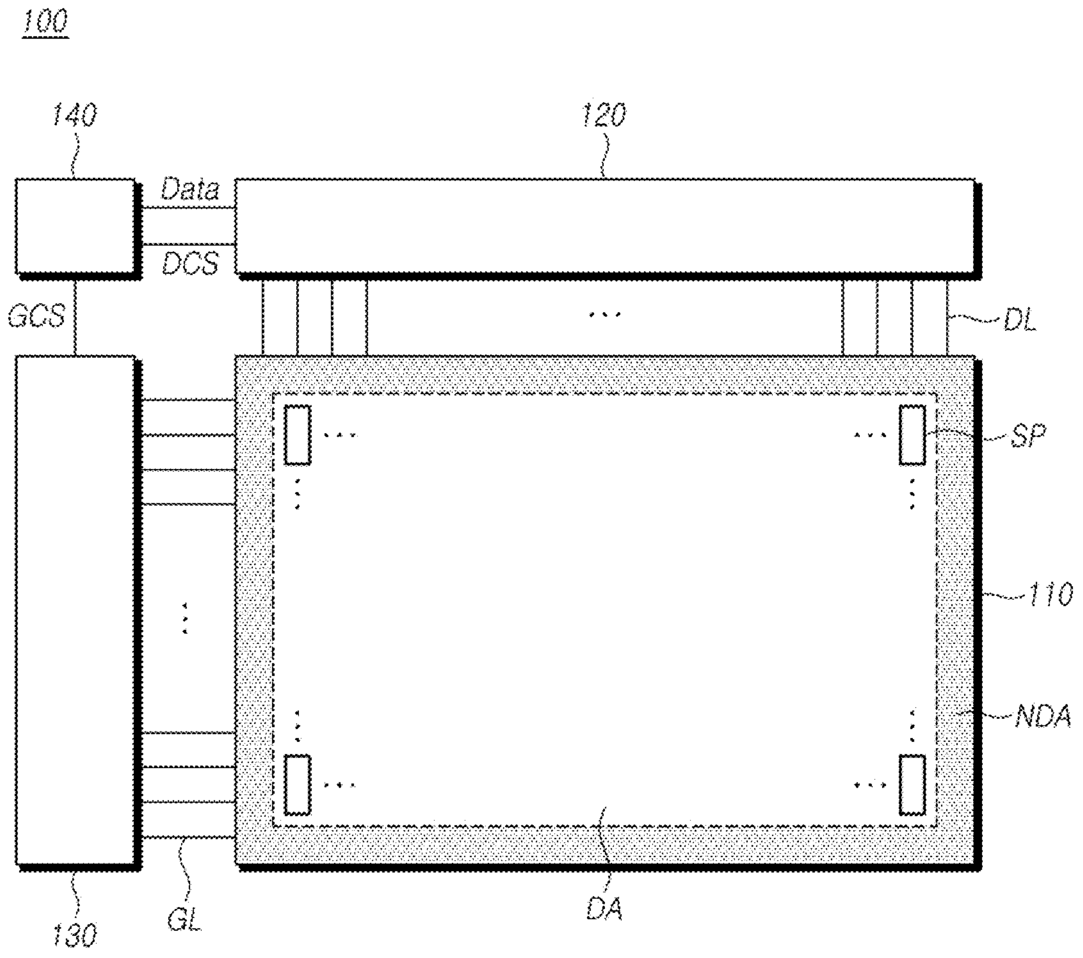
FIG. 1 is a system configuration diagram of a display device in accordance with embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

A "predetermined" value, parameter, threshold, condition or setting can be dynamically determined or adjusted by a machine with or without human inputs. A "predetermined" value, parameter, threshold, condition or setting does not mean or limit to that the value, parameter, threshold, condition or setting is fixed or is input by a human.

FIG. 1 is a system configuration diagram of a display device 100 in accordance with embodiments of the present disclosure.

Referring to FIG. 1, the display device 100 in accordance with the embodiments of the present disclosure may include a display panel 110 and a driving circuit for driving the display panel 110.

The display panel 110 may include signal lines such as a plurality of data lines DL and a plurality of gate lines GL, and may include a plurality of subpixels SP. The display panel 110 may include a display area DA where an image is displayed and a non-display area NDA where an image is not displayed. In the display panel 110, the plurality of subpixels SP for displaying an image may be disposed in the display area DA, and, in the non-display area NDA, driving circuits 120, 130 and 140 may be electrically connected or mounted or pad parts to which integrated circuits or printed circuits are connected may be disposed.

The driving circuit may include a data driving circuit 120 and a gate driving circuit 130, and may further include a controller 140 which controls the data driving circuit 120 and the gate driving circuit 130.

The data driving circuit 120 as a circuit for driving the plurality of data lines DL may supply data signals to the plurality of data lines DL. The gate driving circuit 130 as a circuit for driving the plurality of gate lines GL may supply gate signals to the plurality of gate lines GL.

The gate driving circuit 130 may output a gate signal of a turn-on level voltage or a gate signal of a turn-off level voltage under the control of the controller 140. By sequentially supplying a gate signal of a turn-on level voltage to the plurality of gate lines GL, the gate driving circuit 130 may sequentially drive the plurality of gate lines GL.

In order to control the operation timing of the data driving circuit 120, the controller 140 may supply a data control signal DCS to the data driving circuit 120. The controller 140 may supply a gate control signal GCS for controlling the operation timing of the gate driving circuit 130 to the gate driving circuit 130.

The controller 140 may start a scan according to a timing implemented in each frame, may convert input image data inputted from the outside to be suitable for a data signal format used in the data driving circuit 120 and supply converted image data Data to the data driving circuit 120, and may control a driving of data at a proper time corresponding to the scan.

In order to control the data driving circuit 120 and the gate driving circuit 130, the controller 140 receives a vertical synchronization signal Vsync, a horizontal synchronization signal Hsync, an input data enable signal DE and a clock signal CLK, generates the various control signals DCS and GCS, and outputs the various control signals DCS and GCS to the data driving circuit 120 and the gate driving circuit 130.

The controller 140 may be implemented as a component separate from the data driving circuit 120, or may be implemented as an integrated circuit by being integrated with the data driving circuit 120.

The data driving circuit 120 receives the image data Data from the controller 140, and supplies an image data voltage Vdata to the plurality of data lines DL, thereby driving the plurality of data lines DL. The data driving circuit 120 is also referred to as a source driving circuit. Such a data driving circuit 120 may include at least one source driver integrated circuit (SDIC). Each source driver integrated circuit (SDIC) may include a shift register, a latch circuit, a digital-to-analog converter (DAC), an output buffer, and so forth. As the case may be, each source driver integrated circuit (SDIC) may further include an analog-to-digital converter (ADC).

For example, each source driver integrated circuit (SDIC) may be connected to the display panel 110 in a tape automated bonding (TAB) method, may be connected to bonding pads of the display panel 110 in a chip-on-glass (COG) or chip-on-panel (COP) method, or may be connected to the display panel 110 by being implemented in a chip-on-film (COF) method.

The gate driving circuit 130 may be connected to the display panel 110 in the tape automated bonding (TAB) method, may be connected to bonding pads of the display panel 110 in the chip-on-glass (COG) or chip-on-panel (COP) method, or may be connected to the display panel 110 according to the chip-on-film (COF) method. Alternatively, the gate driving circuit 130 may be formed in the non-display area NDA of the display panel 110 in a gate-in-panel (GIP) type.

When a specific gate line GL is opened by the gate driving circuit 130, the data driving circuit 120 may convert the image data Data received from the controller 140 into the image data voltage Vdata of an analog form, and may supply the image data voltage Vdata to the plurality of data lines DL.

The data driving circuit 120 may be connected to one side (e.g., the top side or the bottom side) of the display panel 110. Depending on a driving method, a panel design method, etc., the data driving circuit 120 may be connected to both sides (e.g., the top side and the bottom side) of the display panel 110, or may be connected to at least two sides of the four sides of the display panel 110.

The gate driving circuit 130 may be connected to one side (e.g., the left side or the right side) of the display panel 110. Depending on a driving method, a panel design method, etc., the gate driving circuit 130 may be connected to both sides (e.g., the left side and the right side) of the display panel 110, or may be connected to at least two sides of the four sides of the display panel 110.

The controller 140 may be a timing controller which is used in a typical display technology, may be a control device which includes a timing controller and further performs other control functions, may be a control device which is different from a timing controller, or may be a circuit in a control device. The controller 140 may be implemented by various circuits or electronic parts such as an integrated circuit (IC), a field programmable gate array (FPGA), an application specific integrated circuit (ASIC) and a processor.

The controller 140 may be mounted on a printed circuit board, a flexible printed circuit or the like, and may be electrically connected to the data driving circuit 120 and the gate driving circuit 130 through the printed circuit board, the flexible printed circuit or the like. The controller 140 may transmit and receive signals to and from the data driving circuit 120 according to at least one predetermined interface. For example, the interface may include a low voltage differential signaling (LVDS) interface, an EPI interface, a Serial Peripheral Interface (SPI), etc. The controller 140 may include a storage such as at least one register.

The display device 100 in accordance with the embodiments of the present disclosure may be a self-luminous display such as an organic light emitting diode (OLED) display, a quantum dot display or a micro light emitting diode (micro LED) display.

Figure 2:
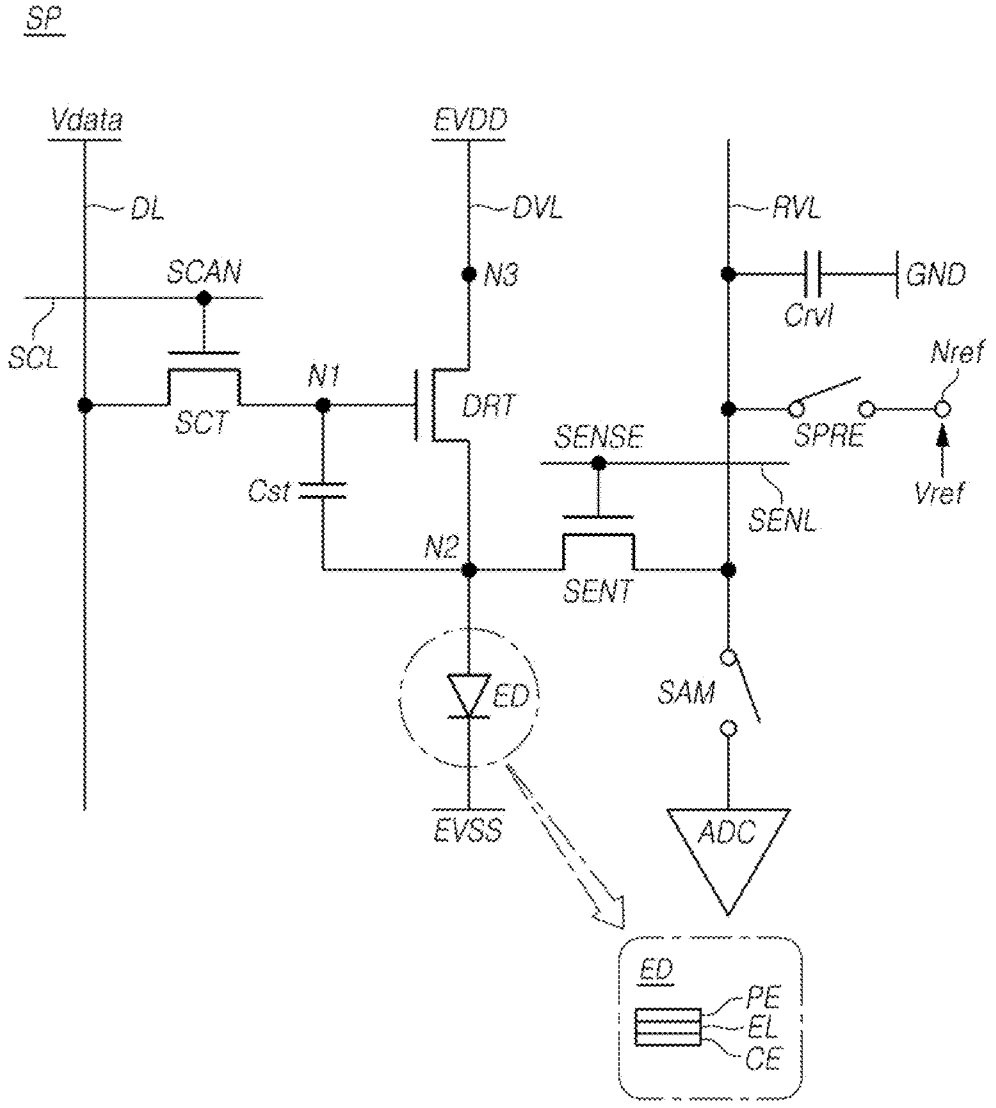
FIG. 2 is an equivalent circuit diagram of a subpixel of a display device in accordance with embodiments of the present disclosure.

FIG. 2 is an equivalent circuit diagram of a subpixel SP of a display device 100 in accordance with embodiments of the present disclosure.

Referring to FIG. 2, each of the plurality of subpixels SP disposed in the display panel 110 of the display device 100 in accordance with the embodiments of the present disclosure may include a light emitting element ED, a driving transistor DRT, a scan transistor SCT, a sensing transistor SENT, and a storage capacitor Cst. As such, when the subpixel SP includes three transistors DRT, SCT and SENT and one capacitor Cst, the subpixel SP is referred to as having a 3T (transistor)1C (capacitor) structure.

The light emitting element ED may include a pixel electrode PE, a common electrode CE, and a light emitting layer EL which is positioned between the pixel electrode PE and the common electrode CE. The pixel electrode PE may be disposed in each subpixel SP, and the common electrode CE may be disposed in common in a plurality of subpixels SP. For example, the pixel electrode PE may be an anode electrode, and the common electrode CE may be a cathode electrode. For another example, the pixel electrode PE may be a cathode electrode, and the common electrode CE may be an anode electrode. For example, the light emitting element ED may be an organic light emitting diode (OLED), a micro light emitting diode (micro LED) or a quantum dot light emitting element.

The driving transistor DRT as a transistor for driving the light emitting element ED may have a first node N1, a second node N2 and a third node N3.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT, may be electrically connected to a source node or a drain node of the sensing transistor SENT, and may also be electrically connected to the pixel electrode PE of the light emitting element ED. The third node N3 of the driving transistor DRT may be electrically connected to a driving voltage line DVL which supplies a driving voltage EVDD.

The scan transistor SCT may be controlled by a scan signal SCAN, and may be connected between the first node N1 of the driving transistor DRT and the data line DL. The scan transistor SCT may be turned on or off according to the scan signal SCAN supplied from a scan signal line SCL which is one kind of gate line GL, thereby controlling connection between the data line DL and the first nodes N1 of the driving transistor DRT.

The scan transistor SCT may be turned on by the scan signal SCAN having a turn-on level voltage, and thereby, may transfer the image data voltage Vdata supplied from the data line DL to the first node N1 of the driving transistor DRT.

The turn-on level voltage of the scan signal SCAN capable of turning on the scan transistor SCT may be a high level voltage or a low level voltage. A turn-off level voltage of the scan signal SCAN capable of turning off the scan transistor SCT may be a low level voltage or a high level voltage. For example, when the scan transistor SCT is an n-type transistor, the turn-on level voltage may be a high level voltage and the turn-off level voltage may be a low level voltage. For another example, when the scan transistor SCT is a p-type transistor, the turn-on level voltage may be a low level voltage and the turn-off level voltage may be a high level voltage.

The sensing transistor SENT may be controlled by a sense signal SENSE, and may be connected between the second node N2 of the driving transistor DRT and a reference voltage line RVL. The sensing transistor SENT may be turned on or off according to the sense signal SENSE supplied from a sense signal line SENL which is another kind of gate line GL, thereby controlling connection between the reference voltage line RVL and the second node N2 of the driving transistor DRT.

The sensing transistor SENT may be turned on by the sense signal SENSE having a turn-on level voltage, and thereby, may transfer a reference voltage Vref supplied from the reference voltage line RVL to the second node N2 of the driving transistor DRT.

The turn-on level voltage of the sense signal SENSE capable of turning on the sensing transistor SENT may be a high level voltage or a low level voltage. The turn-off level voltage of the sense signal SENSE capable of turning off the sensing transistor SENT may be a low level voltage or a high level voltage. For example, when the sensing transistor SENT is an n-type transistor, the turn-on level voltage may be a high level voltage and the turn-off level voltage may be a low level voltage. For another example, when the sensing transistor SENT is a p-type transistor, the turn-on level voltage may be a low level voltage and the turn-off level voltage may be a high level voltage.

The display device 100 may further include a line capacitor Crvl which is formed between the reference voltage line RVL and a ground GND, a sampling switch SAM which controls connection between the reference voltage line RVL and the analog-to-digital converter ADC, and a power switch SPRE which controls connection between the reference voltage line RVL and a reference voltage supply node Nref. The reference voltage Vref outputted from a power supply device may be supplied to the reference voltage supply node Nref, and may be supplied to the reference voltage line RVL through the power switch SPRE.

The sensing transistor SENT may be turned on by the sense signal SENSE having a turn-on level voltage, and thereby, may transfer a voltage V2 of the second node N2 of the driving transistor DRT to the reference voltage line RVL. Accordingly, the line capacitor Crvl which is formed between the reference voltage line RVL and the ground GND may be charged.

The function of the sensing transistor SENT to transfer the voltage V2 of the second node N2 of the driving transistor DRT to the reference voltage line RVL may be used during driving to sense the characteristic value of the subpixel SP. In this case, a voltage transferred to the reference voltage line RVL may be a voltage for calculating the characteristic value of the subpixel SP or a voltage on which the characteristic value of the subpixel SP are reflected.

In the present disclosure, the characteristic value of the subpixel SP may be the characteristic value of the driving transistor DRT or the light emitting element ED. The characteristic value of the driving transistor DRT may include the threshold voltage and mobility of the driving transistor DRT. The characteristic value of the light emitting element ED may include the threshold voltage of the light emitting element ED.

Each of the driving transistor DRT, the scan transistor SCT and the sensing transistor SENT may be an n-type transistor or a p-type transistor. In the present disclosure, for the sake of convenience in explanation, it is exemplified that each of the driving transistor DRT, the scan transistor SCT and the sensing transistor SENT is an n-type.

The storage capacitor Cst may be connected between the first node N1 and the second node N2 of the driving transistor DRT. The storage capacitor Cst is charged with an amount of charge corresponding to a voltage difference between both ends, and serves to maintain the voltage difference between both ends for a predetermined frame time. Accordingly, during the predetermined frame time, the corresponding subpixel SP may emit light.

The storage capacitor Cst may not be a parasitic capacitor (e.g., Cgs or Cgd) which is an internal capacitor existing between the gate node and the source node (or the drain node) of the driving transistor DRT, but may be an external capacitor which is intentionally designed outside the driving transistor DRT.

The scan signal line SCL and the sense signal line SENL may be different gate lines GL. In this case, the scan signal SCAN and the sense signal SENSE may be separate gate signals from each other, and an on-off timing of the scan transistor SCT and an on-off timing of the sensing transistor SENT in one subpixel SP may be independent of each other. In other words, the on-off timing of the scan transistor SCT and the on-off timing of the sensing transistor SENT in one subpixel SP may be the same or different.

Unlike this, the scan signal line SCL and the sense signal line SENL may be the same gate line GL. Namely, a gate node of the scan transistor SCT and a gate node of the sensing transistor SENT in one subpixel SP may be connected to one gate line GL. In this case, the scan signal SCAN and the sense signal SENSE may be the same gate signal, and an on-off timing of the scan transistor SCT and an on-off timing of the sensing transistor SENT in one subpixel SP may be the same as each other.

The reference voltage line RVL may be disposed for each one column of subpixels SP. Unlike this, the reference voltage line RVL may be disposed for each two columns of subpixels SP. When the reference voltage line RVL is disposed for each two columns of subpixels SP, a plurality of subpixels SP may be supplied with the reference voltage Vref from one reference voltage line RVL.

The driving transistor DRT included in each of the plurality of subpixels SP disposed in the display panel 110 of the display device 100 in accordance with the embodiments of the present disclosure may have a unique characteristic value. For example, the unique characteristic value of the driving transistor DRT may include a threshold voltage and a mobility.

The characteristic value of the driving transistor DRT included in each of the plurality of subpixels SP may change with the lapse of a driving time. Driving times of the plurality of subpixels SP are not all the same. That is to say, driving times of some of the plurality of subpixels SP may be different from driving times of the rest. Accordingly, characteristic values of the driving transistors DRT of some subpixels SP among the plurality of subpixels SP may be different from characteristic values of the driving transistors DRT of the other subpixels SP.

Due to deviations in characteristic value among a plurality of driving transistors DRT disposed in the display panel 110, deviations in luminance among the plurality of subpixels SP disposed in the display panel 110 may occur. Accordingly, an unevenness in the luminance of the display panel 110 may occur.

In consideration of this fact, the display device 100 in accordance with the embodiments of the present disclosure may perform a sensing driving on the subpixels SP of the display panel 110 to sense characteristic values of the driving transistors DRT, and may provide a compensation function for reducing deviations in characteristic value among the driving transistors DRT. Sensing periods for sensing characteristic values of the driving transistors DRT may be various.

Figure 3:
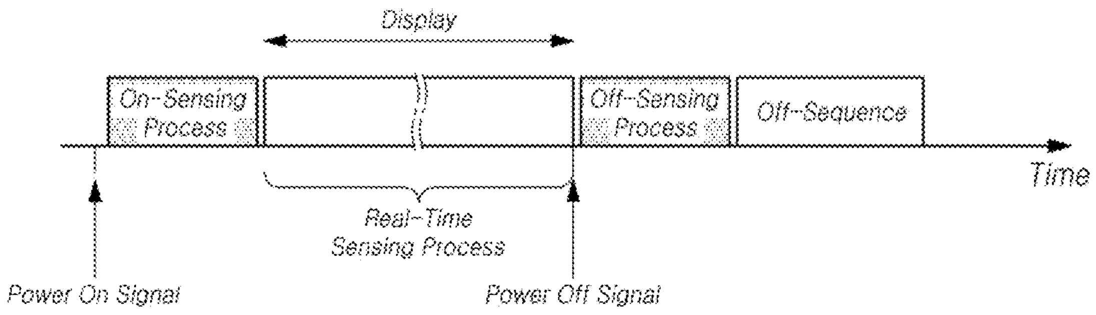
FIG. 3 is a diagram illustrating sensing periods for sensing characteristic values of driving transistors of a display device in accordance with embodiments of the present disclosure.
Figure 4:
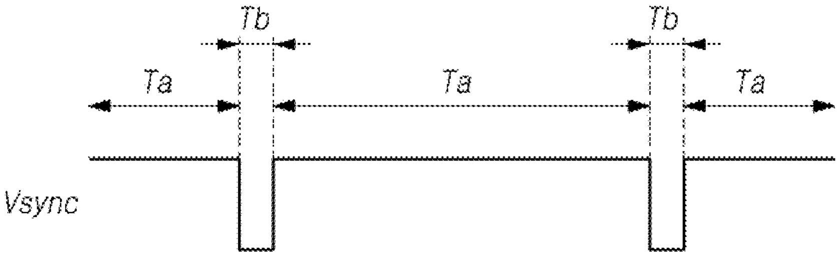
FIG. 4 is a diagram illustrating a vertical synchronization signal of a display device in accordance with embodiments of the present disclosure.

FIG. 3 is a diagram illustrating sensing periods for sensing characteristic values of driving transistors DRT of a display device 100 in accordance with embodiments of the present disclosure. FIG. 4 is a diagram illustrating a vertical synchronization signal Vsync of a display device 100 in accordance with embodiments of the present disclosure.

Referring to FIG. 3, when a power on signal is generated, the display device 100 in accordance with the embodiments of the present disclosure may sense the characteristic value of the driving transistor DRT in each subpixel SP disposed in the display panel 110. Such a sensing process is referred to as an "on-sensing process."

In addition, when a power off signal is generated, before an off-sequence such as a power-off proceeds, the characteristic value of the driving transistor DRT in each subpixel SP disposed in the display panel 110 may be sensed. Such a sensing process is referred to as an "off-sensing process."

Also, during a display driving before the power-off signal is generated and after the power-on signal is generated, the characteristic value of the driving transistor DRT in each subpixel SP may be sensed. Such a sensing process is referred to as a "real-time sensing process."

Referring to FIG. 4, the vertical synchronization signal Vsync as a control signal for defining a frame may repeatedly include a signal period that defines an active time Ta and a signal period that defines a blank time Tb. The active time Ta may be a time during which an actual display driving for updating an image is performed, and the blank time Tb may be an idle time during which an actual display driving is not performed.

For example, the signal period that defines the active time Ta may be a high level voltage period, and the signal period that defines the blank time Tb may be a low level voltage period. For another example, the signal period that defines the active time Ta may be a low level voltage period, and the signal period that defines the blank time Tb may be a high level voltage period.

Referring to FIG. 4, one frame time may include one active time Ta and one blank time Tb.

The aforementioned real-time sensing process may be performed during each blank time Tb between active times Ta on the basis of the vertical synchronization signal Vsync.

Figure 5:
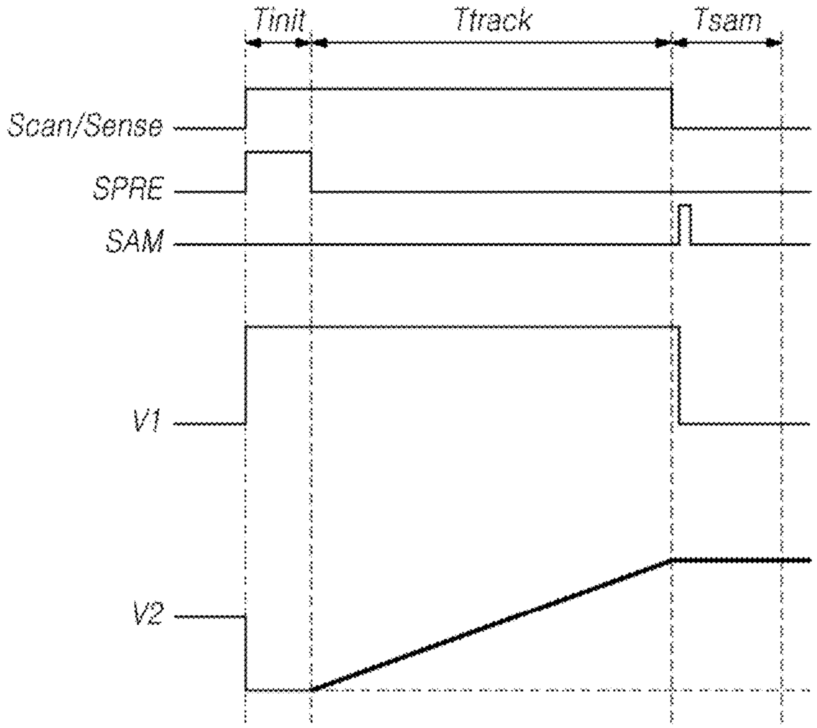
FIG. 5 is a diagram for explaining a sensing driving performed in a real-time sensing process of a display device in accordance with embodiments of the present disclosure.

FIG. 5 is a diagram for explaining a sensing driving performed in a real-time sensing process of a display device 100 in accordance with embodiments of the present disclosure.

A sensing driving time to proceed in the real-time sensing process may include an initialization time Tinit, a tracking time Ttrack and a sampling time Tsam.

Referring to FIG. 5, the initialization time Tinit of the sensing driving time is a time for initializing the first node N1 and the second node N2 of the driving transistor DRT. During the initialization time Tinit, the scan transistor SCT and the sensing transistor SENT may be turned on, and the power switch SPRE may be turned on.

During the initialization time Tinit, a voltage V1 of the first node N1 of the driving transistor DRT is initialized to a reference sensing driving data voltage Vdata_SEN, and a voltage V2 of the second node N2 of the driving transistor DRT is initialized to the sensing driving reference voltage Vref.

Referring to FIG. 5, the tracking time Ttrack of the sensing driving time is a time for boosting the voltage V2 of the second node N2 of the driving transistor DRT until the voltage V2 of the second node N2 of the driving transistor DRT reflects the characteristic value or a change in characteristic value of the driving transistor DRT.

During the tracking time Ttrack, the first node N1 of the driving transistor DRT is in a constant voltage state having the reference sensing driving data voltage Vdata_SEN, but the voltage V2 of the second node N2 of the driving transistor DRT may rise and then saturate.

As the power switch SPRE is turned off or the sensing transistor SENT is turned off, the second node N2 of the driving transistor DRT is floated. Accordingly, the voltage V2 of the second node N2 of the driving transistor DRT rises and then saturates.

When the tracking time Ttrack begins, the voltage difference between the first node N1 and the second node N2 of the driving transistor DRT initialized during the initialization time Tinit may be equal to or greater than the threshold voltage Vth of the driving transistor DRT. In this case, the driving transistor DRT is turned on to conduct a driving current Ids. Therefore, when a voltage difference Vgs between the first node N1 and the second node N2 of the driving transistor DRT is equal to or greater than the threshold voltage Vth, the voltage V2 of the second node N2 of the driving transistor DRT may rise.

When the voltage V2 of the second node N2 of the driving transistor DRT rises and then saturates, the sampling time Tsam may begin.

During the sampling time Tsam of the sensing driving time, the analog-to-digital converter ADC connected to the reference voltage line RVL senses the voltage of the reference voltage line RVL. The voltage of the reference voltage line RVL may correspond to the voltage V2 of the second node N2 of the driving transistor DRT, and may correspond to the charging voltage of the line capacitor Crvl which is formed on the reference voltage line RVL.

During the sampling time Tsam, a sensing voltage Vsen sensed by the analog-to-digital converter ADC may be a voltage corresponding to the characteristic value of the driving transistor DRT. The sensing voltage Vsen may be a voltage corresponding to a mobility of the driving transistor DRT. In addition, the sensing voltage Vsen may be a voltage Vdata-Vth obtained by subtracting the threshold voltage Vth from the image data voltage Vdata or a voltage Vdata-ΔVth obtained by subtracting a threshold voltage deviation ΔVth from the image data voltage Vdata.

The display device 100 may determine the characteristic value or a change therein of the driving transistor DRT in the corresponding subpixel SP on the basis of the sensing voltage Vsen sensed during the sampling time Tsam, may calculate a characteristic value compensation value that reduces or eliminates a deviation in characteristic value between driving transistors DRT, and may store the calculated characteristic value compensation value in a memory.

When supplying the image data voltage Vdata for a display driving to the corresponding subpixel SP, the display device 100 may supply a changed image data voltage Vdata on the basis of the characteristic value compensation value.

Since a characteristic value compensation value is influenced by various factors, a problem may be caused in that the characteristic value compensation value is inaccurately derived.

Figure 6:
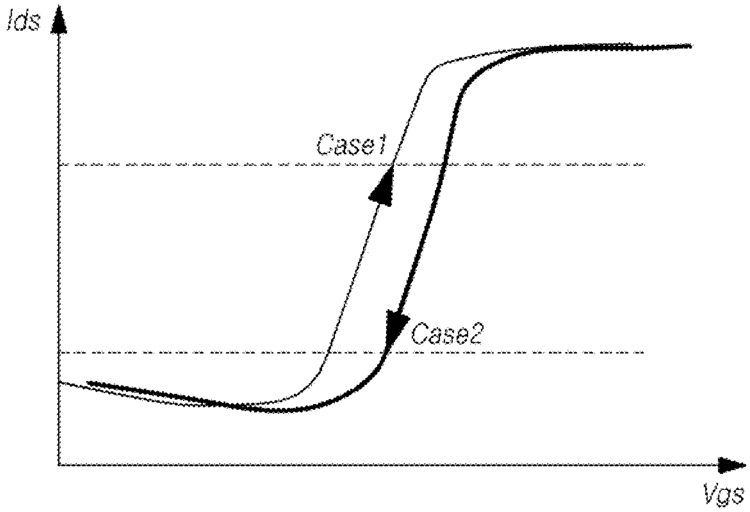
FIGS. 6 and 7 are diagrams for explaining an influence, on a real-time sensing process, of a hysteresis of a display device in accordance with embodiments of the present disclosure.
Figure 7:
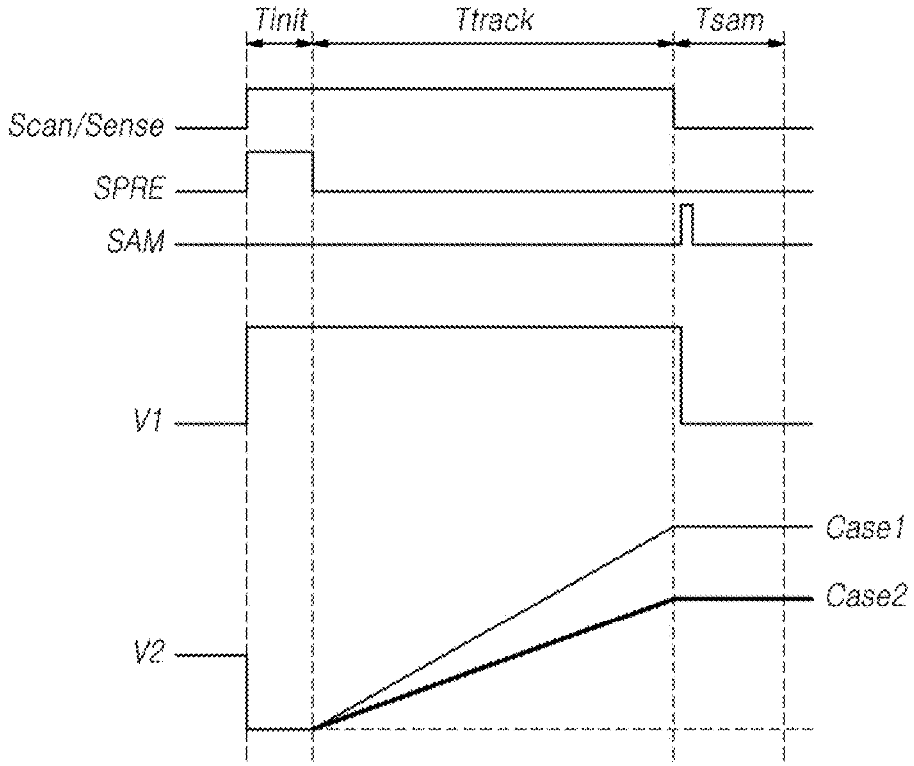

FIGS. 6 and 7 are diagrams for explaining an influence, on a real-time sensing process, of a hysteresis of a display device 100 in accordance with embodiments of the present disclosure.

A display driving may be performed during the active time Ta, and a real-time sensing process may be performed during the blank time Tb.

During the active time Ta in which a display driving is performed, the image data voltage Vdata may be supplied to the plurality of subpixels SP, and thereafter, during the blank time Tb in which a real-time sensing process is performed, the reference sensing driving data voltage Vdata_SEN may be supplied. At this time, a hysteresis may occur.

The hysteresis is a phenomenon in which the image data voltage Vdata supplied during the active time Ta exerts an influence on the real-time sensing process performed during the blank time Tb.

Referring to FIG. 6, the hysteresis may exert an influence on the threshold voltage of the driving transistor DRT.

When the image data voltage Vdata for expressing a low grayscale is supplied during the active time Ta (Case1), the threshold voltage of the driving transistor DRT may be smaller than that when there is no hysteresis. In the case where the image data voltage Vdata for expressing a low grayscale is supplied (Case1), when a specific gate-source voltage Vgs' is applied to the driving transistor DRT, the driving transistor DRT may supply a first driving current Ids1 to the light emitting element ED.

When the image data voltage Vdata for expressing a high grayscale is supplied during the active time Ta (Case2), the threshold voltage of the driving transistor DRT may be larger than that when there is no hysteresis. In the case where the image data voltage Vdata for expressing a high grayscale is supplied (Case2), when the specific gate-source voltage Vgs' is applied to the driving transistor DRT, the driving transistor DRT may supply a second driving current Ids2 to the light emitting element ED.

Even though the same specific gate-source voltage Vgs' is applied to the driving transistor DRT as described above, currents supplied to the light emitting element ED may be different from each other. The reason why a current supplied to the light emitting element ED changes to the first driving current Ids1 or the second driving current Ids2 is because of the influence of a hysteresis. In other words, the threshold voltage of the driving transistor DRT may be influenced according to the hysteresis. Therefore, a problem is caused in that, due to the hysteresis by the image data voltage Vdata supplied during the active time Ta, the real-time sensing process performed during the blank time Tb is influenced.

Referring to FIG. 7, even though the same reference sensing driving data voltage Vdata_SEN is supplied during the initialization time Tinit, the rising speed and saturated voltage value of the voltage V2 of the second node N2 of the driving transistor DRT may vary by a hysteresis.

In comparison with a case where the image data voltage Vdata for expressing a high grayscale is supplied during the active time Ta (Case2), in a case where the image data voltage Vdata for expressing a low grayscale is supplied during the active time Ta (Case1), the rising speed of the voltage V2 of the second node N2 of the driving transistor DRT may be larger and the saturated voltage value of the voltage V2 of the second node N2 of the driving transistor DRT may also be larger.

Namely, a problem is caused in that, by the hysteresis, the rising speed and saturated voltage value of the voltage V2 of the second node N2 of the driving transistor DRT vary.

Embodiments of the present disclosure suggest a controller 140, a display device 100 and a driving method, capable of correcting the influence of a hysteresis in which the image data voltage Vdata supplied during the active time Ta exerts an influence on the real-time sensing process subsequently performed during the blank time Tb. This will be described below in detail.

Figure 8:
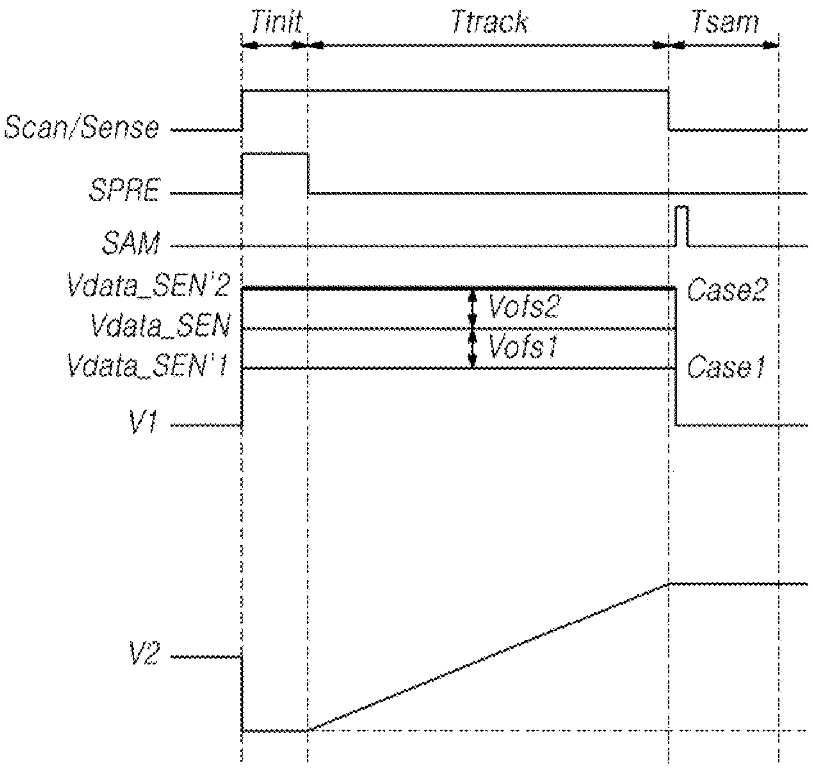
FIG. 8 is a diagram for explaining a real-time sensing process for correcting the influence of a hysteresis of a display device in accordance with embodiments of the present disclosure.

FIG. 8 is a diagram for explaining a real-time sensing process for correcting the influence of a hysteresis of a display device 100 in accordance with embodiments of the present disclosure.

The same content of the real-time sensing process to be described below with reference to FIG. 8 and the real-time sensing process described above with reference to FIG. 5 may be omitted.

Referring to FIG. 8, a characteristic value sensing of sensing the characteristic value of the driving transistor DRT may be performed in the real-time sensing process.

The real-time sensing process may be performed in the blank time Tb between the active times Ta, and the characteristic value sensing may be performed during the blank time Tb.

After the image data voltage Vdata is supplied to the plurality of subpixels SP during the active time Ta, the blank time Tb may proceed.

During the initialization time Tinit included in the blank time Tb after the active time Ta, a sensing driving data voltage Vdata_SEN' may be supplied to the plurality of subpixels SP. The plurality of subpixels SP may be all subpixels SP which are disposed in the display panel 110, or the plurality of subpixels SP may be some subpixels SP which share the same gate line GL.

The sensing driving data voltage Vdata_SEN' may vary according to the image data voltage Vdata supplied during the active time Ta.

The sensing driving data voltage Vdata_SEN' may be a data voltage which is obtained by offset-processing the reference sensing driving data voltage Vdata_SEN by an offset voltage Vofs. The offset voltage Vofs may correspond to the image data voltage Vdata.

An offset processing may include an addition processing or a subtraction processing for data. The fact that the sensing driving data voltage Vdata_SEN' is a data voltage which is obtained by offset-processing the reference sensing driving data voltage Vdata_SEN by the offset voltage Vofs may mean that the sensing driving data voltage Vdata_SEN' is a data voltage which is obtained by adding or subtracting the offset voltage Vofs to or from the reference sensing driving data voltage Vdata_SEN.

The offset voltage Vofs may vary depending on a hysteresis by the image data voltage Vdata supplied to the subpixel SP during the active time Ta.

As the hysteresis is larger, the offset voltage Vofs may have a larger voltage value.

The offset voltage Vofs may include a first offset voltage Vofs1 which corresponds to the image data voltage Vdata for expressing a low grayscale and a second offset voltage Vofs2 which corresponds to the image data voltage Vdata for expressing a high grayscale.

When the image data voltage Vdata for expressing a low grayscale is supplied during the active time Ta (Case1), a sensing driving data voltage Vdata_SEN'1, which is obtained by correcting the reference sensing driving data voltage Vdata_SEN on the basis of the first offset voltage Vofs1 from, may be supplied.

When the image data voltage Vdata for expressing a high grayscale is supplied during the active time Ta (Case2), a sensing driving data voltage Vdata_SEN'2, which is obtained by correcting the reference sensing driving data voltage Vdata_SEN on the basis of the second offset voltage Vofs2, may be supplied.

After the initialization time Tinit, the tracking time Ttrack may proceed.

The tracking time Ttrack may be a time in which the voltage V2 of the second node N2 of the driving transistor DRT rises. The rising speed of the voltage V2 of the second node N2 may correspond to the mobility of the driving transistor DRT.

During the tracking time Ttrack, the rising speed of the voltage V2 of the second node N2 after the sensing driving data voltage Vdata_SEN'1 corrected on the basis of the first offset voltage Vofs1 is supplied may be the same as the rising speed of the voltage V2 of the second node N2 after the sensing driving data voltage Vdata_SEN'2 corrected on the basis of the second offset voltage Vofs2 is supplied.

Referring to FIG. 7 described above, a problem is caused in that, even though the same reference sensing driving data voltage Vdata_SEN is supplied during the initialization time Tinit, the rising speed and saturated voltage value of the voltage V2 of the second node N2 of the driving transistor DRT vary depending on a hysteresis.

Referring to FIG. 8, since the sensing driving data voltage Vdata_SEN' corrected on the basis of the offset voltage Vofs is supplied during the initialization time Tinit, the rising speed and saturated voltage value of the voltage V2 of the second node N2 may be the same in the case where the image data voltage Vdata for expressing a low grayscale is supplied during the active time Ta (Case1) and the case where the image data voltage Vdata for expressing a high grayscale is supplied during the active time Ta (Case2).

That is to say, as the sensing driving data voltage Vdata_SEN' corrected on the basis of the offset voltage Vofs is supplied during the initialization time Tinit, the influence of a hysteresis exerted on sensing of the characteristic value of a driving transistor may be corrected.

The offset voltage Vofs may be derived and stored in a memory in advance before the blank time Tb. A process in which the offset voltage Vofs is derived will be described below.

Figure 9:
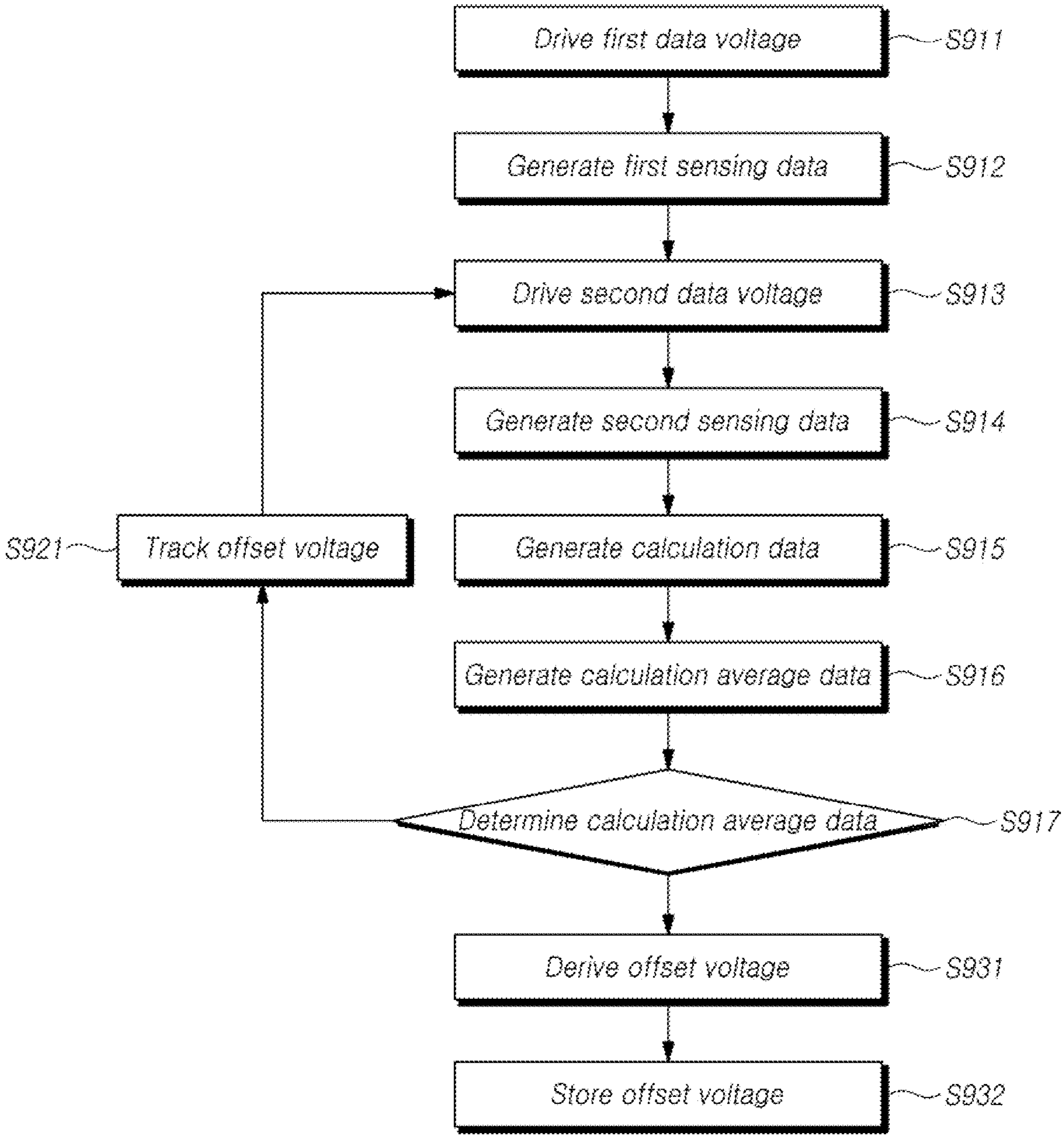
FIG. 9 is a diagram showing a process of deriving an offset voltage of a display device in accordance with embodiments of the present disclosure.

FIG. 9 is a diagram showing a process of deriving an offset voltage Vofs of a display device 100 in accordance with embodiments of the present disclosure.

Referring to FIG. 9, the process of deriving the offset voltage Vofs may include first data voltage driving step S911 to offset voltage storing step S932.

In the first data voltage driving step S911, a first data voltage Vdata1 may be supplied to a subpixel SP to drive the subpixel SP. The first data voltage Vdata1 is a voltage for causing the subpixel SP to emit light with a specific luminance, and there is no limit to the magnitude of the first data voltage Vdata1. For example, the first data voltage Vdata1 may be a black voltage Vblack for emitting light with a luminance of a low grayscale. As a turn-on signal is supplied to the entirety of the plurality of gate lines GL, all the subpixels SP may be driven, or as a turn-on signal is supplied to only some gate lines GL, only subpixels SP which share the corresponding gate lines GL may be driven.

In first sensing data generation step S912, after the subpixel SP supplied with the first data voltage Vdata1 is driven, sensing of the characteristic value of the driving transistor DRT may be performed. The sensing of the characteristic value may be performed through the real-time sensing process described above. After the reference sensing driving data voltage Vdata_SEN is supplied to the subpixel SP during the initialization time Tinit, first sensing data SEN1 may be generated on the basis of the sensing voltage Vsen sensed during the sampling time Tsam.

In second data voltage driving step S913, a second data voltage Vdata2 may be supplied to the subpixel SP to drive the subpixel SP. The second data voltage Vdata2 is a voltage for causing the subpixel SP to emit light with a specific luminance, and there is no limit to the magnitude of the second data voltage Vdata2. The second data voltage Vdata2 may be a voltage for emitting light with a relatively higher luminance than the first data voltage Vdata1. For example, when the first data voltage Vdata1 is the black voltage Vblack, the second data voltage Vdata2 may have various voltage values such as 5V, 10V and 16V. As a turn-on signal is supplied to the entirety of the plurality of gate lines GL, all the subpixels SP may be driven, or as a turn-on signal is supplied to only some gate lines GL, only subpixels SP which share the corresponding gate lines GL may be driven.

In second sensing data generation step S914, after the subpixel SP supplied with the second data voltage Vdata2 is driven, sensing of the characteristic value of the driving transistor DRT may be performed. The sensing of the characteristic value may be performed through the real-time sensing process described above. After the reference sensing driving data voltage Vdata_SEN is supplied to the subpixel SP during the initialization time Tinit, second sensing data SEN2 may be generated on the basis of the sensing voltage Vsen sensed during the sampling time Tsam.

In calculation data generation step S915, calculation data SEN may be generated by calculating the difference value between the first sensing data SEN1 and the second sensing data SEN2.

In calculation average data generation step S916, calculation average data SEN_avg may be generated by calculating the average value of calculation data SEN of the subpixel SP sharing the same gate line GL among calculation data SEN. Meanwhile, unlike generation of calculation average data SEN_avg of a first embodiment being the above-described calculation average data SEN_avg, the average value of calculation data SEN of a subpixel SP disposed at a specific location among calculation data SEN may be set as calculation average data SEN_avg of a second embodiment. After the calculation average data generation step S916 in which the calculation average data SEN_avg of the first embodiment is generated or the calculation average data SEN_avg of the second embodiment is generated, calculation average data determination step S917 may be performed.

In the calculation average data determination step S917, it may be determined whether the calculation average data SEN_avg is 0 or a value close to 0.

When it is determined in the calculation average data determination step S917 that the calculation average data SEN_avg is 0 or a value close to 0, in offset voltage derivation step S931, an initial offset voltage Vofs_init may be derived as the offset voltage Vofs.

However, when the calculation average data SEN_avg is not 0 or a value close to 0, in offset voltage tracking step S921, the second data voltage Vdata2 is corrected on the basis of the initial offset voltage Vofs_init. The initial offset voltage Vofs_init may be a voltage for correcting the calculation average data SEN_avg to be 0 or a value close to 0. There is no limit on whether the initial offset voltage Vofs_init is a positive number or a negative number, and there is no limit to the magnitude of the initial offset voltage Vofs_init.

After correcting the second data voltage Vdata2 on the basis of the initial offset voltage Vofs_init, the second data voltage driving step S913 is performed. The subpixel SP supplied with the second data voltage Vdata2 corrected on the basis of the initial offset voltage Vofs_init is driven. Then, the second sensing data generation step S914, the calculation data generation step S915, the calculation average data generation step S916 and the calculation average data determination step S917 may be performed.

When it is determined in the calculation average data determination step S917 that the calculation average data SEN_avg is not 0 or a value close to 0, the offset voltage tracking step S921 may be repeatedly performed. In the offset voltage tracking step S921 to be repeated, the second data voltage Vdata2 is corrected on the basis of another initial offset voltage Vofs_init'.

When it is determined in the calculation average data determination step S917 that the calculation average data SEN_avg is 0 or a value close to 0, in the offset voltage derivation step S931, the initial offset voltage Vofs_init' may be derived as the offset voltage Vofs.

In the offset voltage storing step S932, the derived offset voltage Vofs may be stored in the memory.

Figure 10:
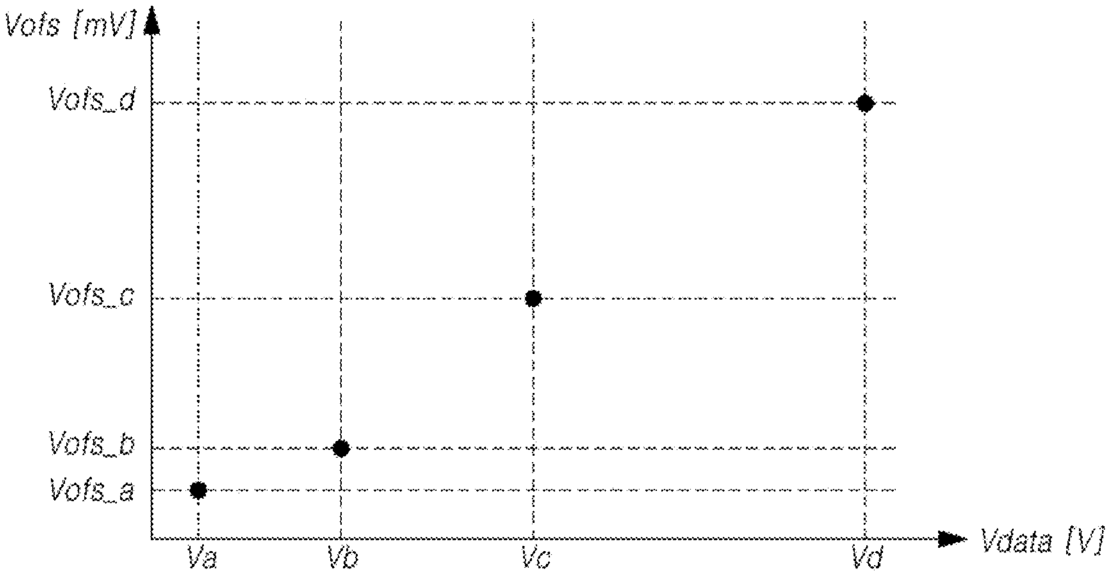
FIG. 10 is a graph showing the relationship between a data voltage and an offset voltage of a display device in accordance with embodiments of the present disclosure.

FIG. 10 is a graph showing the relationship between an image data voltage Vdata and an offset voltage Vofs of a display device 100 in accordance with embodiments of the present disclosure.

Referring to FIG. 10, a graph may be shown by setting the image data voltage Vdata as the X-axis and the offset voltage Vofs as the Y-axis. The image data voltage Vdata is the second data voltage Vdata2 which is not corrected on the basis of the initial offset voltage Vofs_init in the process of deriving the offset voltage Vofs. The offset voltage Vofs is an offset voltage derived in correspondence to the second data voltage Vdata2.

For example, an offset voltage Vofs_a to an offset voltage Vofs_d are offset voltages derived in correspondence to a data voltage Va to a data voltage Vd.

As the reference sensing driving data voltage Vdata_SEN is corrected on the basis of the offset voltage Vofs by using the offset voltage Vofs corresponding to the image data voltage Vdata, the influence of a hysteresis exerted on sensing of the characteristic value of the driving transistor DRT may be corrected.

In the process of deriving the offset voltage Vofs, all offset voltages Vofs corresponding to all image data voltages Vdata, respectively, may be derived. In addition, by using interpolation, all offset voltages Vofs corresponding to all image data voltages Vdata, respectively, may be derived from offset voltages Vofs corresponding to N number of image data voltages Vdata, respectively.

Offset voltages Vofs corresponding to all image data voltages Vdata, respectively, may be routed to generate an offset voltage lookup table LUT.

The offset voltage lookup table LUT may be used in the real-time sensing process.

Figure 11:
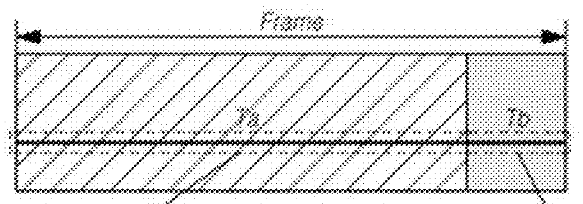
FIG. 11 is a diagram illustrating a frame time including an active time and a blank time of a display device in accordance with embodiments of the present disclosure.

FIG. 11 is a diagram illustrating a frame time including an active time Ta and a blank time Tb of a display device 100 in accordance with embodiments of the present disclosure.

A frame time Frame may include the active time Ta and the blank time Tb.

During the active time Ta, the image data voltage Vdata for expressing an image may be supplied to each of the plurality of subpixels SP.

During the blank time Tb, the real-time sensing process may be performed. The real-time sensing process may be performed only in subpixels PXL1 to PXLn which share sensing gate lines GLs as some gate lines GL among the plurality of gate lines GL.

During the active time Ta, image data voltages Vdata supplied to the subpixels PXL1 to PXLn which share the sensing gate line GLs may be known. In addition, the offset voltage Vofs corresponding to the image data voltage Vdata may be known by using the offset voltage lookup table LUT.

In other words, during the initialization time Tinit, the sensing driving data voltage Vdata_SEN' obtained by correcting the reference sensing driving data voltage Vdata_SEN on the basis of the offset voltage Vofs may be supplied.

During the initialization time Tinit, as a sensing driving data voltage corrected on the basis of an offset voltage is supplied, the influence of a hysteresis exerted on sensing of the characteristic value of a driving transistor may be corrected.

Figure 12:
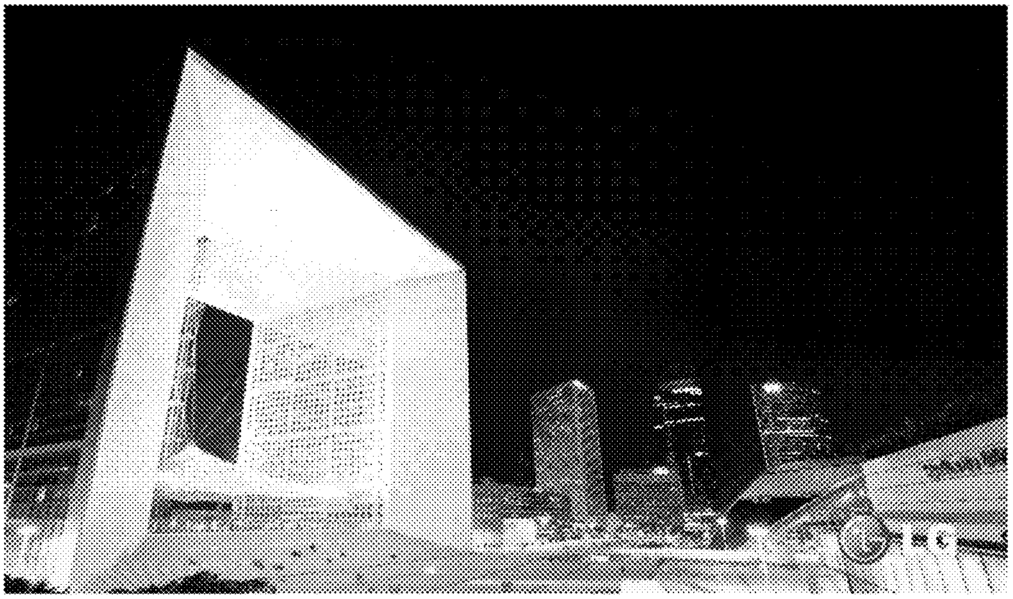
FIGS. 12, 13 and 14 are diagrams for explaining a hysteresis correction effect of a display device in accordance with embodiments of the present disclosure.
Figure 13:
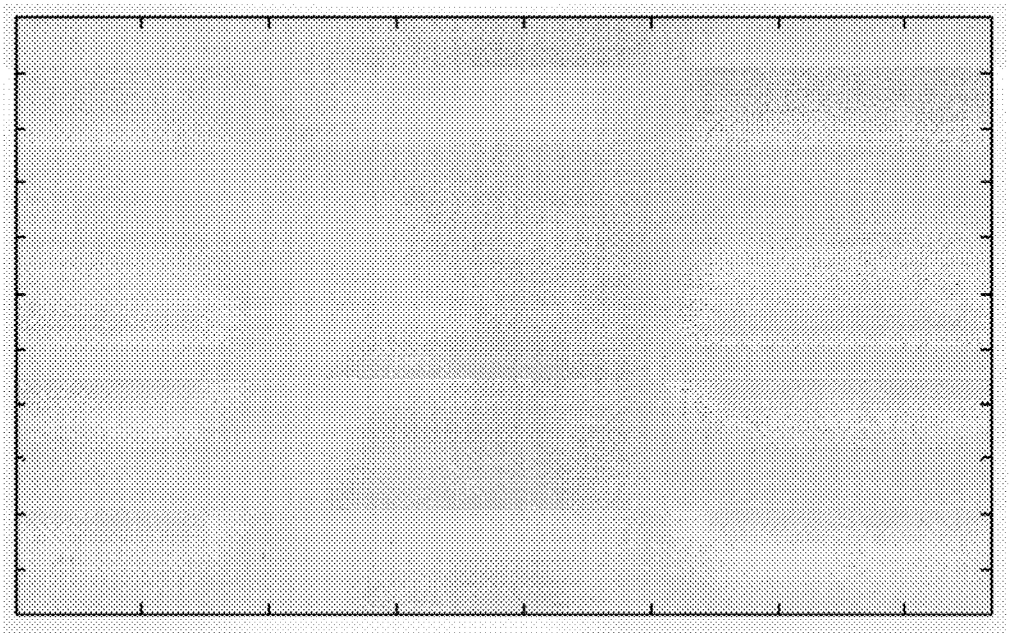
Figure 14:
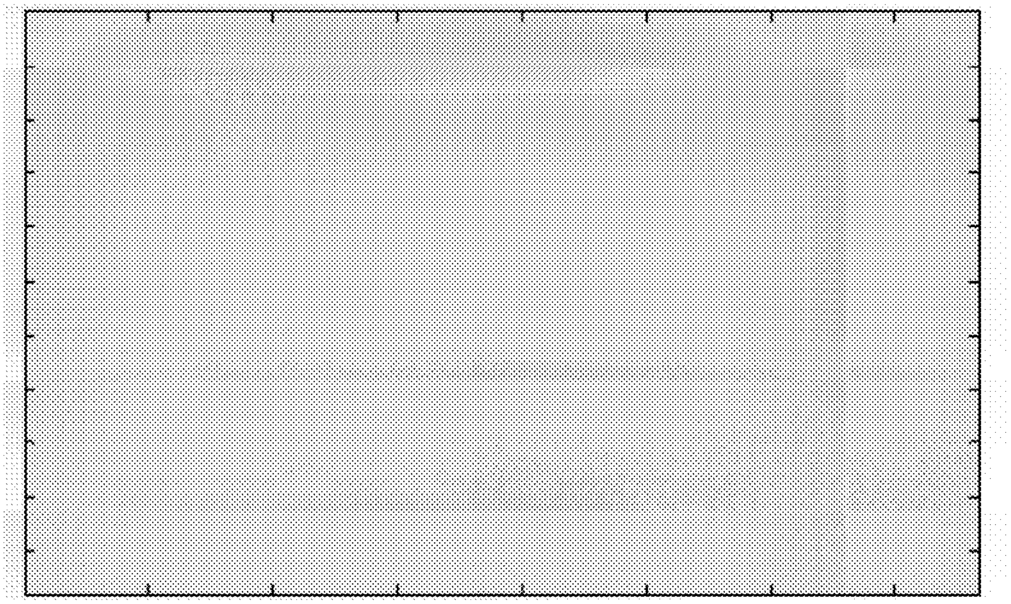

FIGS. 12, 13 and 14 are diagrams for explaining a hysteresis correction effect of a display device 100 in accordance with embodiments of the present disclosure.

Referring to FIG. 12, the image shown in FIG. 12 is an image which is outputted from the display panel 110 during the active time Ta included in one frame time.

After the image data voltage Vdata is supplied to the subpixel SP to output an image during the active time Ta, a characteristic value sensing for sensing the characteristic value of the driving transistor DRT may be performed during the blank time Tb to generate sensing data Data_SEN.

Referring to FIG. 13, the hysteresis of the image data voltage Vdata supplied during the active time Ta may exert an influence on the sensing data Data_SEN.

In order to correct the influence of the hysteresis of the image data voltage Vdata supplied during the active time Ta, the sensing driving data voltage Vdata_SEN' corrected on the basis of the offset voltage Vofs may be supplied during the initialization time Tinit included in the blank time Tb.

Referring to FIG. 14, as the sensing driving data voltage Vdata_SEN' corrected on the basis of the offset voltage Vofs is supplied, the sensing data Data_SEN in which the influence of the hysteresis is corrected may be generated.

Figure 15:
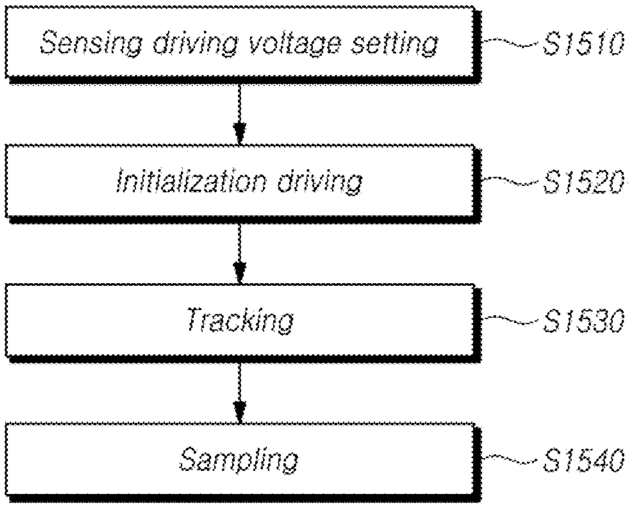
FIG. 15 is a flowchart showing a real-time sensing process of a display device in accordance with embodiments of the present disclosure.

FIG. 15 is a flowchart showing a real-time sensing process of a display device 100 in accordance with embodiments of the present disclosure.

Referring to FIG. 15, the real-time sensing process may include first step S1510 of setting a sensing driving voltage of the driving transistor DRT, second step S1520 of initializing the voltage V1 of the first node N1 and the voltage V2 of the second node N2 of the driving transistor DRT, third step S1530 of tracking a change in the voltage V2 of the second node N2 of the driving transistor DRT, and fourth step S1540 of sensing and sampling the voltage V2 of the second node N2 of the driving transistor DRT.

The characteristic value sensing of sensing the characteristic value of the driving transistor DRT may be performed in the real-time sensing process.

The first step S1510 may be step of setting the reference sensing driving data voltage Vdata_SEN.

The first step S1510 may be performed after image data voltages are supplied to the plurality of subpixels SP during the active time Ta.

The second step S1520 may be step of supplying the sensing driving data voltage Vdata_SEN' to the first node N1 of the driving transistor DRT and supplying the sensing driving reference voltage Vref to the second node N2 of the driving transistor DRT, thereby initializing the first node N1 and the second node N2 of the driving transistor DRT.

The sensing driving data voltage Vdata_SEN' may vary according to the image data voltage Vdata supplied during the active time Ta.

The sensing driving data voltage Vdata_SEN' may be a data voltage which is obtained by offset-processing the reference sensing driving data voltage Vdata_SEN by the offset voltage Vofs. The offset voltage Vofs may correspond to the image data voltage Vdata.

The offset voltage Vofs may vary depending on a hysteresis by the image data voltage Vdata supplied to the subpixel SP during the active time Ta.

As the hysteresis is larger, the offset voltage Vofs may have a larger voltage value.

The offset voltage Vofs may be derived and stored in the memory in advance before the first step S1510.

The third step S1530 may be step of changing the voltage V2 of the second node N2 of the driving transistor DRT by floating the second node N2 of the driving transistor DRT.

The fourth step S1540 may be step of sampling, after a predetermined time elapses from a time point at which the voltage V2 of the second node N2 of the driving transistor DRT is changed, the voltage V2 of the second node N2 of the driving transistor DRT.

Figure 16:
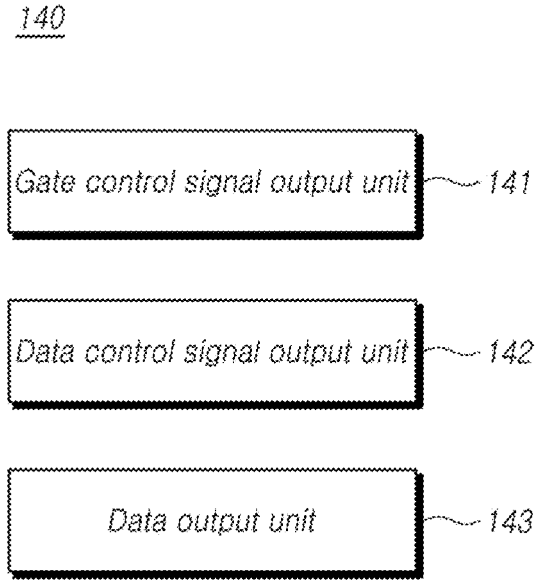
FIG. 16 is a diagram illustrating a controller in accordance with embodiments of the present disclosure.

FIG. 16 is a diagram illustrating a controller 140 in accordance with embodiments of the present disclosure.

The controller 140 may include a gate control signal output unit 141 which outputs the gate control signal GCS to the gate driving circuit 130, a data control signal output unit 142 which outputs the data control signal DCS to the data driving circuit 120, and a data output unit 143 which outputs data to the data driving circuit 120 and the gate driving circuit 130.

The data output unit 143 may output, during the active time Ta, the image data Data to be supplied in the form of analog voltages to the plurality of subpixels SP disposed in the display panel 110. The image data Data may be outputted to the data driving circuit 120, and the data driving circuit 120 may supply the image data voltage Vdata obtained by converting the image data Data into the form of an analog voltage to the data line DL.

The data output unit 143 may output, during the blank time Tb after the active time Ta, sensing driving data data_SEN' to be supplied in the form of analog voltages to the plurality of subpixels SP. The sensing driving data data_SEN' may be outputted to the data driving circuit 120, and the data driving circuit 120 may supply the sensing driving data voltage Vdata_SEN' obtained by converting the sensing driving data data_SEN' into the form of an analog voltage to the data line DL.

The sensing driving data data_SEN' may be changed according to the image data Data to be supplied in the form of an analog voltage during the active time Ta.

The sensing driving data data_SEN' may be data which is obtained by offset-processing reference sensing driving data data_SEN by the offset voltage Vofs. The offset voltage Vofs may correspond to the image data voltage Vdata which is obtained as the image data Data is converted into an analog form.

The offset voltage Vofs may vary depending on a hysteresis by the image data voltage Vdata to be supplied to the plurality of subpixels SP during the active time Ta.

According to the embodiments of the present disclosure described above, in consideration of that a hysteresis by the image data voltage Vdata supplied to the subpixel SP during the active time Ta may exert an influence on the real-time sensing process, by correcting the reference sensing driving data voltage Vdata_SEN on the basis of the offset voltage Vofs, it is possible to correct the influence of a hysteresis exerted on sensing of the characteristic value of the driving transistor DRT.

According to the embodiments of the present disclosure, it is possible to provide a controller, a display device and a driving method thereof capable of low power consumption by correcting the influence of a hysteresis.

A brief description of the embodiments of the present disclosure described above is as follows.

According to the embodiments of the present disclosure, it is possible to provide a display device including a plurality of data lines, a plurality of reference voltage lines and a plurality of subpixels connected to the plurality of data lines and the plurality of reference voltage lines, wherein the plurality of data lines include a first data line which is connected to a first subpixel among the plurality of subpixels, the plurality of reference voltage lines include a first reference voltage line which is connected to the first subpixel, the first subpixel includes a first light emitting element, a first driving transistor, a first scan transistor and a first sensing transistor, a first node of the first driving transistor is electrically connectable to the first data line through the first scan transistor, a second node of the first driving transistor is electrically connectable to the first reference voltage line through the first sensing transistor, an image data voltage is supplied to the first subpixel during an active time, a sensing driving data voltage is supplied to the first subpixel during a blank time after the active time, and the sensing driving data voltage is variable depending on the image data voltage.

The sensing driving data voltage is a data voltage which is obtained by offset-processing a reference sensing driving data voltage by an offset voltage, and the offset voltage may correspond to the image data voltage. The offset voltage may vary depending on a hysteresis by the image data voltage supplied to the first subpixel during the active time. As the hysteresis is larger, the offset voltage may be larger. The offset voltage may be derived and stored in a memory in advance before the blank time.

The offset voltage may include a first offset voltage which corresponds to a first image data voltage being the image data voltage for expressing a low grayscale, and a second offset voltage which corresponds to a second image data voltage being the image data voltage for expressing a high grayscale. The voltage rising speed of the second node of the first driving transistor after the sensing driving data voltage corrected on the basis of the first offset voltage is supplied may be the same as the voltage rising speed of the second node of the first driving transistor after the sensing driving data voltage corrected on the basis of the second offset voltage is supplied.

During the blank time, a characteristic value sensing of sensing a characteristic value of the first driving transistor for the first subpixel may be performed. During the blank time, the voltage rising speed of the second node of the first driving transistor may correspond to a mobility of the first driving transistor.

A data driving circuit which supplies the corrected sensing driving data voltage to the first data line may be further included, wherein the data driving circuit may include an analog-to-digital converter for sensing the voltage of the first reference voltage line, a sampling switch which controls connection between the first reference voltage line and the analog-to-digital converter, and an initialization switch which controls connection between a sensing driving reference voltage supply node supplied with the sensing driving reference voltage and the first reference voltage line.

According to the embodiments of the present disclosure, it is possible to provide a method for driving a display device, including first step of setting a sensing driving data voltage, second step of, by supplying the sensing driving data voltage to a first node of a driving transistor and supplying a sensing driving reference voltage to a second node of the driving transistor, initializing the first node and the second node of the driving transistor, third step of, by floating the second node of the driving transistor, changing the voltage of the second node of the driving transistor, and fourth step of, after a predetermined time elapses from a time point at which the voltage of the second node of the driving transistor is changed, sampling the voltage of the second node of the driving transistor, wherein the first step is performed after an image data voltage is supplied to a first subpixel during an active time, and in the second step, the sensing driving data voltage is variable depending on the image data voltage.

The sensing driving data voltage is a data voltage which is obtained by offset-processing a reference sensing driving data voltage by an offset voltage, and the offset voltage may correspond to the image data voltage. The offset voltage may vary depending on a hysteresis by the image data voltage supplied to the first subpixel during the active time. As the hysteresis is larger, the offset voltage may be larger. The offset voltage may be derived and stored in a memory in advance before the first step.

According to the embodiments of the present disclosure, it is possible to provide a controller including a control signal output unit which outputs a data control signal to a data driving circuit and a data output unit which outputs data to the data driving circuit, wherein the data output unit outputs, during an active time, image data to be supplied to a first subpixel among a plurality of subpixels disposed in a display panel and outputs, during a blank time after the active time, sensing driving data to be supplied to the first subpixel, and the sensing driving data is variable depending on the image data.

The sensing driving data is data which is obtained by offset-processing reference sensing driving data by an offset voltage, and the offset voltage may correspond to an image data voltage obtained by converting the image data into an analog form.

The offset voltage may vary depending on a hysteresis by the image data voltage to be supplied to the first subpixel during the active time.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a plurality of data lines;

a plurality of reference voltage lines; and a plurality of subpixels connected to the plurality of data lines and the plurality of reference voltage lines, wherein the plurality of data lines include a first data line which is connected to a first subpixel among the plurality of subpixels, and the plurality of reference voltage lines include a first reference voltage line which is connected to the first subpixel, wherein the first subpixel includes a first light emitting element, a first driving transistor, a first scan transistor and a first sensing transistor, a first node of the first driving transistor is electrically connectable to the first data line through the first scan transistor, and a second node of the first driving transistor is electrically connectable to the first reference voltage line through the first sensing transistor, wherein an image data voltage is supplied to the first subpixel during an active time, and wherein a sensing driving data voltage is supplied to the first subpixel during a blank time different from the active time, and the sensing driving data voltage is variable depending on the image data voltage, wherein the sensing driving data voltage is configured to be obtained by offset-processing a reference sensing driving data voltage by an offset voltage, and the offset voltage corresponds to the image data voltage, and wherein the offset voltage comprises:

a first offset voltage corresponding to a first image data voltage for expressing a low grayscale; and a second offset voltage corresponding to a second image data voltage for expressing a high grayscale, wherein the sensing driving data voltage obtained by correcting the reference sensing driving data voltage with the first offset voltage and the sensing driving data voltage obtained by correcting the reference sensing driving data voltage with the second offset voltage have different voltage levels.

2. The display device of claim 1, wherein the offset voltage is variable based on a hysteresis related to the image data voltage supplied to the first subpixel during the active time.

3. The display device of claim 2, wherein the offset voltage is configured to be greater in response to the hysteresis being greater.

4. The display device of claim 1, comprising a memory configured to store a value of the offset voltage determined before the blank time.

5. The display device of claim 1, wherein a voltage rising speed of the second node of the first driving transistor after a sensing driving data voltage corrected based on the first offset voltage is supplied is same as a voltage rising speed of the second node of the first driving transistor after a sensing driving data voltage corrected based on the second offset voltage is supplied.

6. The display device of claim 1, comprising a sensing transistor configured to sense, n during the blank time, a characteristic value of the first driving transistor for the first subpixel.

7. The display device of claim 6, wherein during the blank time, a voltage rising speed of the second node of the first driving transistor corresponds to a mobility of the first driving transistor.

8. The display device of claim 1, further comprising:

a data driving circuit configured to supply a corrected sensing driving data voltage to the first data line, wherein the data driving circuit comprises:

an analog-to-digital converter for sensing a voltage of the first reference voltage line;

a sampling switch configured to control connection between the first reference voltage line and the analog-to-digital converter; and an initialization switch configured to control connection between a sensing driving reference voltage supply node supplied with the sensing driving reference voltage and the first reference voltage line.

9. A method for driving a display device, comprising:

setting a sensing driving data voltage;

by supplying the sensing driving data voltage to a first node of a driving transistor and supplying a sensing driving reference voltage to a second node of the driving transistor, initializing the first node and the second node of the driving transistor;

by floating the second node of the driving transistor, changing a voltage of the second node of the driving transistor; and after a predetermined time elapses from a time point at which a voltage of the second node of the driving transistor is changed, sampling a voltage of the second node of the driving transistor, wherein the setting the sensing driving data voltage is performed after an image data voltage is supplied to a first subpixel during an active time, and wherein, in the initializing the first node and the second node of the driving transistor, the sensing driving data voltage is variable depending on the image data voltage, wherein the sensing driving data voltage is set by offset-processing a reference sensing driving data voltage by an offset voltage, and the offset voltage corresponds to the image data voltage, wherein the offset voltage include:

a first offset voltage corresponding to a first image data voltage for expressing a low grayscale; and a second offset voltage corresponding to a second image data voltage for expressing a high grayscale, and wherein the sensing driving data voltage obtained by correcting the reference sensing driving data voltage with the first offset voltage and the sensing driving data voltage obtained by correcting the reference sensing driving data voltage with the second offset voltage have different voltage levels.

10. A controller, comprising:

a control signal output unit configured to output a data control signal to a data driving circuit; and a data output unit configured to output data to the data driving circuit, wherein the data output unit outputs, during an active time, image data to be supplied to a first subpixel among a plurality of subpixels disposed in a display panel, and wherein the data output unit outputs, during a blank time different from the active time, sensing driving data to be supplied to the first subpixel, and the sensing driving data is variable based on the image data, wherein the sensing driving data is obtained by offset-processing reference sensing driving data by an offset voltage, and the offset voltage corresponds to an image data voltage obtained by converting the image data into an analog form, and wherein the offset voltage comprises:

a first offset voltage corresponding to a first image data voltage for expressing a low grayscale; and a second offset voltage corresponding to a second image data voltage for expressing a high grayscale, wherein the sensing driving data voltage obtained by correcting the reference sensing driving data voltage with the first offset voltage and the sensing driving data voltage obtained by correcting the reference sensing driving data voltage with the second offset voltage have different voltage levels.

11. The controller of claim 10, wherein the offset voltage is variable based on a hysteresis related to the image data voltage to be supplied to the first subpixel during the active time.

* * * * *